(12) United States Patent
Katz

(10) Patent No.: US 7,379,544 B2
(45) Date of Patent: May 27, 2008

(54) COMPREHENSIVE TELEPHONE CALL SCREENING SYSTEM

(75) Inventor: Ronald A. Katz, Los Angeles, CA (US)

(73) Assignee: Telebuyer, LLC, Los Angeles, CA (US)

( * ) Notice: Subject to any disclaimer, the term of this patent is extended or adjusted under 35 U.S.C. 154(b) by 0 days.

(21) Appl. No.: 10/287,837

(22) Filed: Nov. 5, 2002

(65) Prior Publication Data

US 2004/0086101 A1    May 6, 2004

(51) Int. Cl.
H04M 3/42 (2006.01)
H04M 15/06 (2006.01)

(52) U.S. Cl. .......................... 379/210.02; 379/210.03; 379/142.02; 379/207.13; 379/207.15

(58) Field of Classification Search ................ 379/120, 379/142.01, 142.04, 188, 200, 207.13, 207.15, 379/210.02, 210.03, 215.01
See application file for complete search history.

(56) References Cited

U.S. PATENT DOCUMENTS

| | | | |
|---|---|---|---|
| 4,277,649 A | | 7/1981 | Sheinbein |
| 5,127,049 A | | 6/1992 | Sabo |
| 5,329,578 A | | 7/1994 | Brennan et al. |
| 5,452,342 A | | 9/1995 | Hashimoto .................. 379/100 |
| 5,467,388 A | * | 11/1995 | Redd et al. ............. 379/210.02 |
| 5,497,414 A | * | 3/1996 | Bartholomew .......... 379/142.02 |
| 5,602,908 A | | 2/1997 | Fan |
| 5,864,613 A | * | 1/1999 | Flood .......................... 379/188 |
| 5,974,133 A | | 10/1999 | Fleischer et al. ............ 379/230 |
| 6,385,310 B1 | * | 5/2002 | Holiday, II .................. 379/120 |
| 6,418,211 B1 | | 7/2002 | Irvin |
| 6,445,783 B1 | * | 9/2002 | Creswell et al. ........ 379/207.13 |
| 6,628,429 B1 | * | 9/2003 | Razazian ..................... 358/406 |
| 6,697,461 B1 | | 2/2004 | Middleswarth et al. .. 379/88.24 |
| 6,721,059 B1 | * | 4/2004 | Sturgeon et al. ........... 358/1.15 |
| 6,760,421 B2 | | 7/2004 | Heilmann et al. ........... 379/189 |

OTHER PUBLICATIONS

Official Site of TeleZapper™ : "Frequently Asked Questions" pages Nov. 15, 2002.

* cited by examiner

*Primary Examiner*—Rasha Alaubaidi
(74) *Attorney, Agent, or Firm*—Berry & Associates P.C.

(57) ABSTRACT

A dynamic telephone-call screening system detects indications of the character for incoming calls as a basis to determine acceptance. Calls that are identified and indicated to be undesirable, as from a facsimile machine, may be categorically screened on the basis of character. Calls identified to be from an undesired terminal also are recognized and screened. Indications of undesired character calls and undesired calling terminal are stored for reference testing. Upon receiving an undesired call, its character and source may be stored for future reference.

16 Claims, 4 Drawing Sheets

COMPREHENSIVE TELEPHONE CALL SCREENING SYSTEM

FIELD OF THE INVENTION

The present invention relates to call screening for a telephone instrument and particularly to selectively blocking unwanted calls by using dynamic criteria.

BACKGROUND DESCRIPTION

Over recent years, the applications and uses for telephone service have expanded at an accelerated pace. Automated telephone operations have enabled telephone promotions and campaigns that reach vast numbers of telephone lines. Also, expanded telephone operations now serve a variety of apparatus that is foreign to traditional telephonic voice communication, for example, facsimile machines. With the continuing expansion of telephone activity, the number of erroneously placed calls ("wrong numbers") has greatly increased. Generally, for various reasons, a typical telephone line can be expected to receive many calls that are simply unwanted, perhaps several per day. Such calls not only are an inconvenient annoyance, but also may actually concern or intimidate the recipients, particularly when such calls occur during the night.

Some unwanted telephone calls simply are accidental, for example calls in which the called number is erroneously entered, either manually or automatically. Other unwanted calls are deliberate as in the case of mass calling promotions. Generally, as the numbers of unwanted calls have steadily increased, various solutions have been proposed. For example, some people have adopted a practice of using a telephone answering machine to screen calls. Also, caller identification units are in widespread use for screening. However, in spite of various proposals, the problem continues to exist, perhaps even intensifying. Consequently, a need exists for developments to mitigate the problem of unwanted telephone calls.

SUMMARY OF THE INVENTION

In part, the present invention is based on recognizing various indicating criteria to identify and screen or block unwanted telephone calls. For example, it is to be recognized that Automatic Number Identification (ANI) service is provided by public switched telephone networks to indicate the calling telephone number at the called telephone instrument. Various uses have been proposed for ANI signals, including caller identification and call-waiting identification. Accordingly, in the past, ANI signals have been proposed for use in forms of call screening.

Other forms of signals received at called telephone instruments reveal the character of an incoming call. For example, facsimile machines (FAX devices) may send a tone (1100 Hz) sometimes referred to as an "audio fax tone" or "calling tone" (CNG) which is intermittent. Specifically, the tone may be of a one-half (½) second duration, repeated after a pause of some 3 seconds for an interval of some 45 seconds. Thus, the CNG character signal identifies the calling device as a FAX machine. Of course, the intended purpose of the CNG tone is to establish a handshake with another FAX machine.

Other forms of call character signals (variously indicated) also may be employed to designate or characterize incoming calls. For example, character signals or indications may be provided variously (intentionally or otherwise) to indicate mass calling promotions, computerized calls or other calls susceptible to characterization.

Essentially, as disclosed herein, the present invention involves developing and maintaining a dynamic record of call identification signals (including telephone calling numbers and call character data) for selectively screening unwanted calls. Essentially, on the occurrence of an incoming call, identification signals associated with the call are tested or processed against stored data to determine the fate of the call. For example, call identification signals may include calling telephone number signals, e.g., ANI signals and/or call character signals or indications, e.g., CNG signals indicative of a calling FAX device. On initial receipt, the call identification signals are processed and may be stored to control the fate of subsequent incoming calls.

The developed record of call identification signals is dynamic in the sense that it grows with use of the associated telephone line. If an incoming call is accepted, the identification signals accompanying the calls are temporarily stored pending a decision by the instrument user. That is, while some call identification signals may indicate an unwanted call (which is processed accordingly), other call identification signals may accompany an acceptable call. However, indicating signals attendant an accepted call are stored affording the user of the called telephone line an opportunity selectively to record the stored signals for future blocking. Thus, the system includes structure for receiving call identification signals that accompany incoming telephone calls, and for future use to selectively block or screen unwanted calls. Thus, the record of the system is dynamic in the sense that it may change over time with operations of the tended line. Accordingly, an effective and dynamic system of call screening is provided.

BRIEF DESCRIPTION OF THE DRAWINGS

In the drawings, which constitute a part of the specification, an exemplary embodiment is set forth exhibiting various objectives and features hereof. Specifically.

DESCRIPTION OF THE ILLUSTRATIVE EMBODIMENT

As required, detailed illustrative embodiments of the present invention are disclosed herein. However, signal forms, storage, data formats, operating structures and so on in accordance with the present invention may be embodied in a wide variety of different forms, some of which may be quite different from those of the disclosed embodiments. Consequently, the specific structures and functional details disclosed herein are intended to be merely representative; yet in that regard, they are deemed to afford the best embodiments for purposes of disclosure and to provide a basis for the claims herein which define the scope of the present invention.

Figure 1:
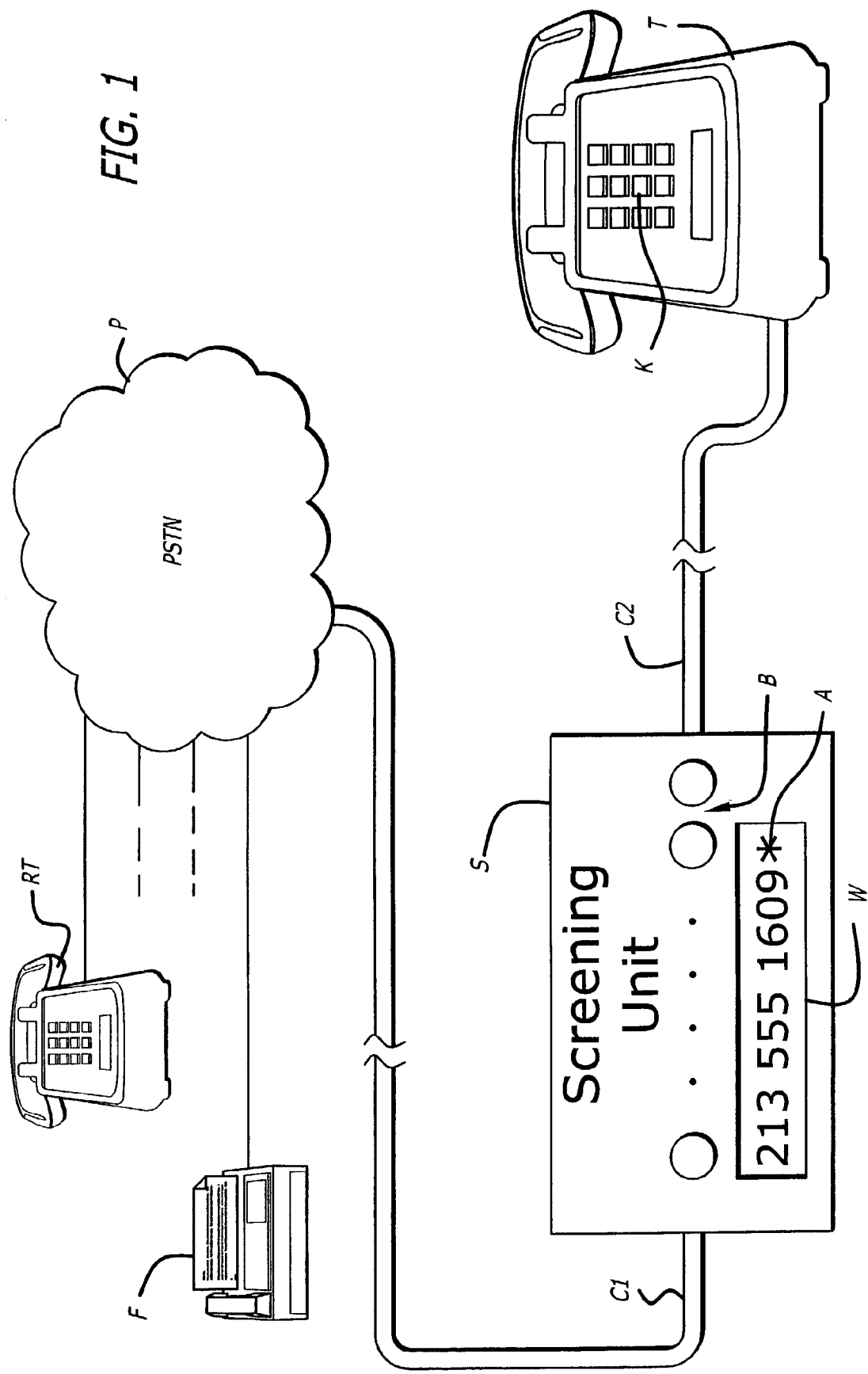
FIG. 1 is an elevational view showing a screening unit in accordance herewith, shown along with various related telephone apparatus.

Referred initially to FIG. 1, a conventional telephone instrument T (right) is shown coupled through a screening unit S to a public switched telephone network (PSTN) designated P. The network P accommodates a multitude of telephonic apparatus symbolically represented in FIG. 1 by a facsimile machine F and a remote telephone terminal RT. As shown, the network P is coupled to the screening unit S through a cable C1, and the unit S is in turn coupled to the instrument T through a cable C2.

It is to be understood that for purposes of illustration the screening unit S and the telephone instrument T are shown as separate structures, however, a composite or integrated unit is certainly a viable alternative. In that regard, it has become common practice to incorporate telephone answering structures into conventional telephones. Similarly, it is anticipated that such structures may simply further incorporate elements as disclosed for the screening unit S to provide a single physical structure. Accordingly, component packaging and the physical arrangement of components are not critical to the present invention. That is, the location of elemental components including those of, a telephone instrument, a system of the present invention, and perhaps an answering machine, may vary in accordance with commercial and architectural design considerations.

In the operation of the structure as depicted in FIG. 1, incoming telephone calls from the network P are received through the line C1 at the screening unit S. Along with such calls, call identification signals may be indicated in the form of caller identification signals (e.g. ANI or MIN) and/or call character signals, as for example CNG signals which indicate a call from a facsimile machine. Of course, a ring signal also is provided to indicate the presence of the incoming call. Thus, a variety of call identification signals (variously indicated) may be manifest in the line C1. Herein, such call identification signals are classified as calling telephone number signals, or call character signals.

In one embodiment, the screening unit S tests the call identification signals for appearance on a negative list of caller terminals (individual or type) from which unwanted calls are specified to originate. In the event of a coincidence, the call is blocked and the communication ceases. Note that in an alternative embodiment, the screening unit S may store a positive list of acceptable call identification signals. In such an embodiment, calling terminals or calls that do not appear on the positive list may be blocked or otherwise treated. Still another alternative embodiment may involve the utilization of both a negative list and a positive list to support various processing. For example, call identification signals represented on the negative list may be blocked, calls represented on the positive list may be accepted and calls not appearing on either list may be variously treated. For example, unlisted or unidentified calls might be permitted to leave a message or afforded to some other communication possibility. Thus, a basic function of the disclosed system involves testing the call identification signals to determine select screening operations.

Further in relation to the system, as illustrated in FIG. 1, call identification signals are manifest in a display window W of the unit S. For example, as shown, the window W shows the calling telephone number "213 555 1609" to indicate the calling number of an incoming call. Also, as an example, an asterisk A in the window W indicates the presence of a CNG signal revealing that the call is from a FAX machine. These manifestations are displayed as a matter of receivable information and in relation to altering a reference memory for future screening. For example, a user may store fresh identification signals for future control.

To preliminarily consider the storage operation, assume that the user desires to store the number "213 555 1607" as a reference for future screening operations. A set of buttons B on the unit S enables a user to add or remove displayed call identification signals form the reference data. Note that by using the buttons B, operating off-line, the user also can manually enter symbols for display in the window W. Thus, the user may simply enter the number "213 555 1607" using the keypad K causing representative signals to be formed, which are manifest in the window W of the unit S. Numerical codes may indicate call character signals. With the display established to indicate the content of a working or buffer storage, the control operations may be executed, e.g. "add" to reference list. The buttons B may include the following controls: calling number, call character, add, delete, display, advance, clear etc. The buttons further may include the conventional controls of a telephone answering machine.

Recapitulating, it is to be understood that in the operation of the system of FIG. 1, the screening function of the unit S is dynamic. That is, as indicated above, and described in greater detail below, the stored record of reference identification data is variable with use of the screening unit S. Thus, identification signals may be added to, or deleted from, the record to accommodate growth and change in the call-screening reference criteria.

To consider some basic operations of the system in a preliminary way. Incoming calls that are determined to be acceptable by the screening unit S simply are bridged to the telephone instrument T to activate the"ring" and thereby signal an incoming call. At the conclusion of such a call, under manual control, temporarily, stored identification signals, manifest by the window W, may be added to the reference list. Such alteration is accomplished by touching the control buttons B on the screening unit S depending on the form of reference list implementation.

Figure 2:
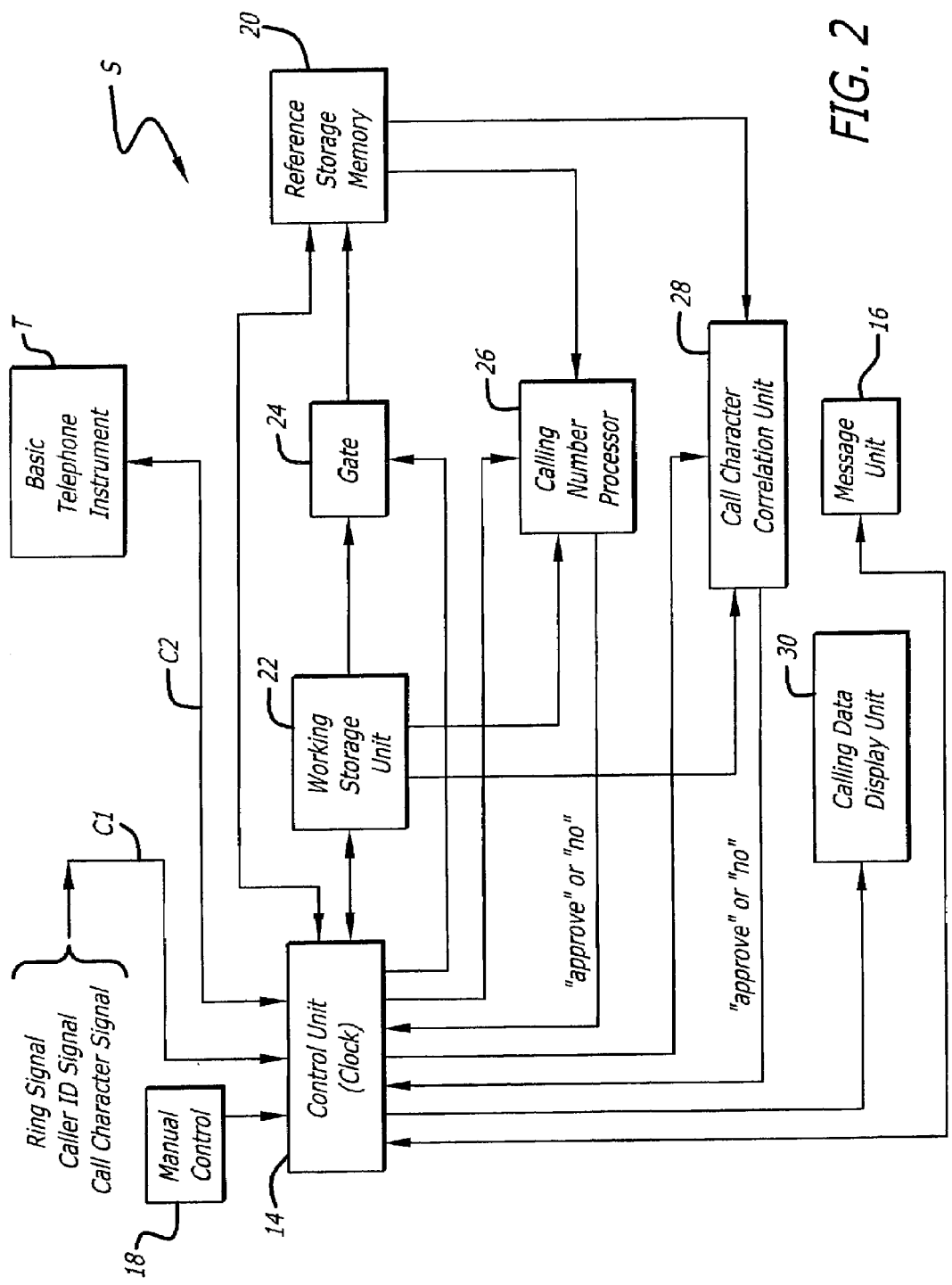
FIG. 2 is a block diagram of a screening unit as physically depicted in FIG. 1.

Turning now to FIG. 2, the structure of the screening unit S is represented in block form along with a block representing the basic telephone instrument T. The cable C1 is represented for voice communication, as well as to preliminarily receive: ring signals, call identification signals and call character signals. Also the cable C2 is shown extending from the control unit 14 to the instrument T. The cable C1 enters a control unit 14. The control unit 14 also is coupled to various elements as described below, including a message unit 16 (FIG. 2, lower right). In this embodiment, the control unit 14 and the message unit 16 contain components of a contemporary answering machine. Such operation is somewhat ancillary to the basic functions of the screening unit S as described in detail below.

The control unit 14 also is coupled to a plurality of manual controls represented by a block 18 (upper left) designated "manual control" which embodies the buttons B (FIG. 1) and also includes the typical manual controls associated with a telephone answering machine.

Generally, in the operation of the system of FIG. 2, a reference storage memory 20 (upper right) contains reference signal data, as lists, serving as the criteria for call screening. As indicated above, negative and/or positive lists of calling telephone numbers may be stored along with call character signal representations. The memory 20 is directly coupled to the control unit 14 to facilitate cooperative processing. Also, connections are provided from the control unit 14 to the memory 20 through a buffer or working storage unit 22 and a gate 24 for the provision of fresh data to the memory 20.

To facilitate identification signal testing, reference data is provided from the memory 20 to a calling number processor 26 and a call character correlation unit 28. The processor 26 and the correlation unit 28 also receive current call identification signals and call character signals from the working storage unit 22 as well as control signals from the control unit 14. Accordingly, the processor 26 and the correlation unit 28 provide signals indicative of test results back to the control unit 14.

Finally, the control unit 14 also is connected to a data display unit 30, which provides representations in the window W as shown in FIG. 1. Typically, the display window W may reveal the calling telephone number, and/or any existing call character signal. As indicated above, the calling telephone number is derived, as for example from ANI or MIN signals provided from the public switched telephone network P (FIG. 1). As shown, the call character symbol, e.g., an asterisk (*) A, derived from a CNG signal, indicates the call character as being from a facsimile machine. That is, various call character indications, for example including facsimile machine signals, e.g., CNG, are identified and accordingly the control system 14 provides a representative symbol as the asterisk (*) A.

Figure 3:
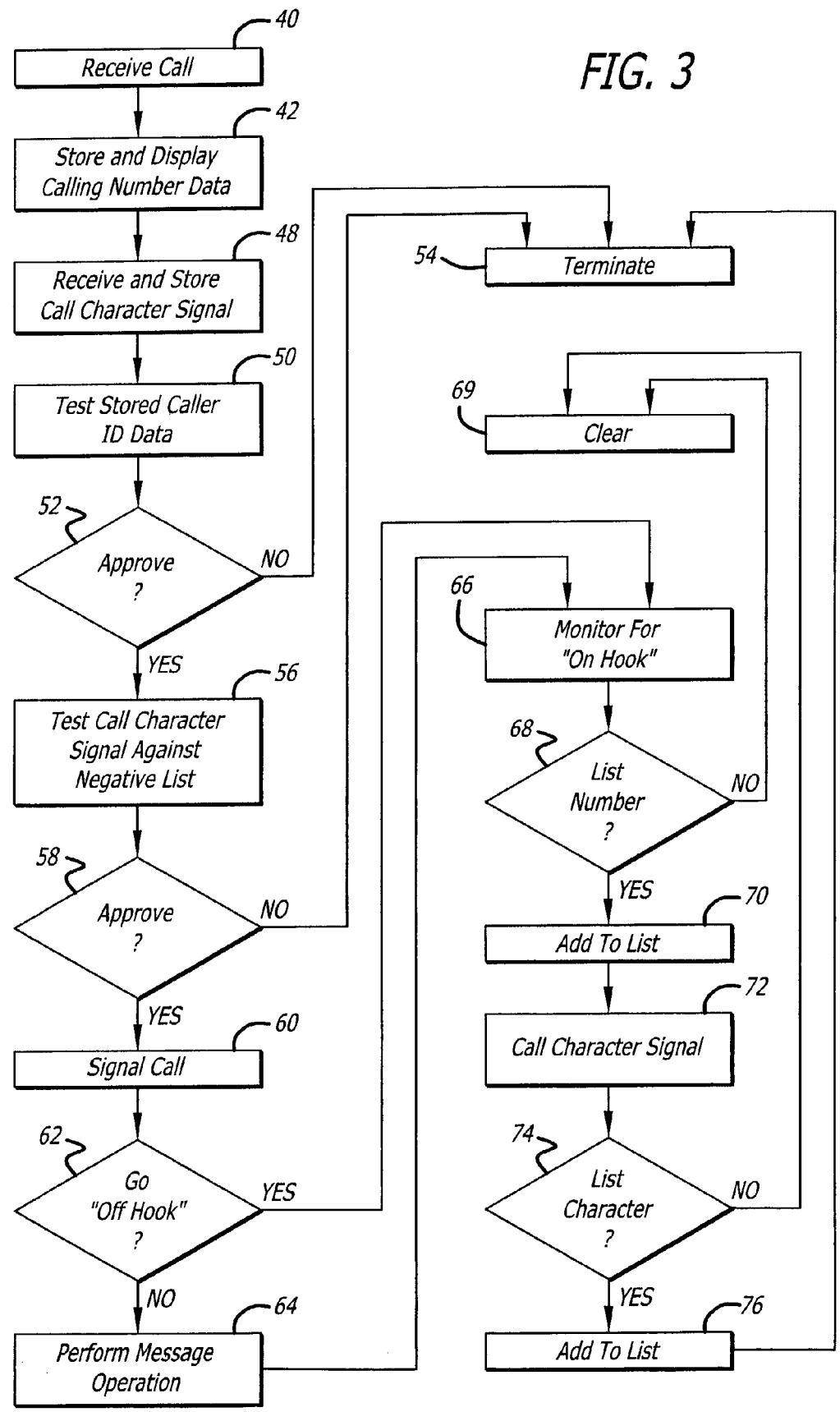
FIG. 3 is flowchart detailing the operation of the system represented in FIG. 2.

In view of the above explanations, a comprehensive understanding of the system may now best be accomplished by assuming certain basic conditions and pursuing a sequence of operations involved with the logic as charted in FIG. 3. Accordingly, assume that the screening unit S is installed in association with the public switched telephone network P and the individual telephone instrument T as shown in FIG. 1. Further assume that the reference storage memory 20 (FIG. 2) contains reference data identifying certain calling telephone numbers (for example, numbers that are to be blocked) along with certain call character signals, e.g., CNG signals (also designating calls to be blocked). Various techniques may be used to load the reference storage memory 20. Generally, the user may load some preliminary data with the understanding that the reference screening data will grow with use of the telephone instrument T. As an alternative example, a person acquiring the screening unit S may have the supplier initially record known screening data.

In any event, with some reference data loaded, next, assume the presence of a ring signal on the incoming line of the cable C1, which is applied to the control unit 14. Further assume that the ring signal was initiated from a telephone terminal, e.g., terminal RT (FIG. 1), which is identified in the memory 20 (FIG. 2) as an unwanted call source. Specifically, assume that the reference storage memory 20 stores the telephone number of the calling terminal on a negative list.

Figure 4:
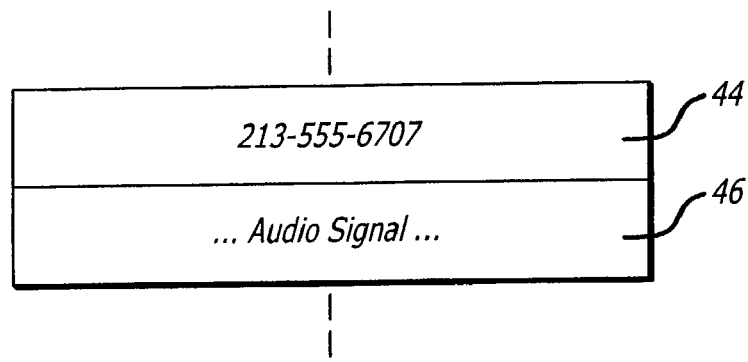
FIG. 4 is a chart indicative of working storage in the screening unit of FIG. 2.

With the occurrence of the ring signal, the control unit 14 goes "off hook" to receive the call as represented by the block 40 in FIG. 3. Note that the telephone instrument T remains inactive. However, the control unit 14 receives the calling telephone number, e.g., via ANI which is set in the working storage unit 22 (FIG. 2) as indicated by the block 42 of FIG. 3. For example, the working storage unit 22 may involve a relatively few number of fields as represented in FIG. 4, specifically, calling telephone number fields as field 44 and character signal storing fields as a field 46. The character signal fields may store call character signals in an analog or digital form.

Pursuing the current example, next, assume no call character signal is manifest; however, as indicated above that the received calling telephone number signal indicates an unwanted call. Accordingly, in the absence of a call character signal no related operations are performed (block 48). However, the stored calling telephone number is tested as indicated by a block 50 (FIG. 3). Specifically, the received calling telephone number is supplied to the calling number processor 26 (FIG. 2) for comparison with a reference negative list of unwanted calling numbers provided from the reference memory 20. In the assumed example, coincidence would occur, and as a consequence, a "no signal" would be supplied from the processor 26 to the control unit 14, disapproving the call. The testing or "matching" operation is represented in FIG. 3 by a query block 52.

In the assumed situation, as a match did occur, the process would move to a termination step as represented by the block 54. The termination operation may include a canned message to the caller as "The number you are calling is not accessible at this time". Alternatively, calls may be simply terminated by going "on hook". If no match occurs, and there is no received character signal, the operation advances to signal a call at the instrument T as treated below.

To pursue the explanation, assume that the assumed ring signal erroneously originating from a facsimile machine F (FIG. 1) as a result of misdialing. In such a situation, a received call character signal is received and stored in the working storage unit 22 (FIG. 3 block 48). That is, the CNG signal is stored in buffer memory. At the present stage of consideration, next assume that representations of the received CNG signal also are stored in the reference memory 20 (FIG. 2) indicating that calls of such a character are unwanted and are to be blocked.

As an aside, note that for a particular facsimile machine F, the reference storage memory 20 may store both the calling telephone number of the facsimile machine and the call character signal CNG. In such an event, the calling facsimile telephone number would result in call blocking and the process would not reach the stage of testing the call character signal. However, if only the call character signal was recorded by the memory 20, with the call character signal stored (block 48) the process would proceed from the query block 52 to the correlation operation of the block 56. That is, the received signal CNG would be stored in the working storage unit 22, displayed and correlated against the negative list of stored call character signals. Of course, in a negative list operating mode, a match would indicate disapproval, while the absence of the call character signal from the negative list would indicate approval.

Considering the logic of FIG. 3, the call character-testing process step is indicated by a query block 58. In the event of disapproval the process again proceeds to the termination operation as represented by the block 54 and as treated above. Conversely, approval of the call would advance the process to the stage of signaling the existence of the call by the telephone instrument T. Specifically, a ring signal now is applied to the telephone instrument T. The operation is illustrated in FIG. 3 by the block 60.

Following receipt of the ring signal by the telephone T, advancement of the process depends on whether or not the telephone instrument T is taken off hook. The alternatives are indicated by the query block 62. If the telephone instrument T is not answered, a message may be provided in the unit 16 (FIG. 2) as indicated by the block 64, after which the process proceeds to simply monitor for the continuing "on hook clear" state as indicated by a block 66. The state exists when the telephone T is on hook and there is no current call. Note that a series of unanswered calls may be stored for display and later action as described below.

As indicated in FIG. 3 by the block 62, an answered call also advances the process to the monitoring operation of block 66, however, in a different sequence controlled by the control unit 14. That is, either when a call is not answered, or after the call has been answered and is concluded, an "on hook clear" monitoring phase occurs which affords the instrument user an opportunity to add signals from the working storage unit 22 (FIG. 2) to the reference memory 20. For example, assume the window W (FIG. 1) reveals the telephone number of a caller known to the user either by voice communication or the message unit 16. If the user wishes to add that telephone number to a negative list in the memory 20, the buttons B (FIG. 1) constituting the manual control 18 (FIG. 2) are activated to add the call identification signals in question. Thus, the system affords the user a controlled time window to add a stored number or call character data for example to a negative list. The query block 68 represents the step in relation to a calling number. If the number is not added, a "no" path is followed from the block 68 advancing the process to the clear operation as represented by the block 69. Alternatively, if the number is to be listed in the reference storage memory 20 (FIG. 2) its addition to the list is indicated by a block 70 (FIG. 3).

Though not necessary, in the embodiment under consideration, when a call is of an undesired character, both the calling number and the call character are stored for future screening. However, in that regard, the user of the telephone instrument T is afforded an opportunity to add a call character signal to screen calls in the future. Considering the operation in somewhat greater detail, the presence of a detected call character signal is manifest in the window W as described above, for example in the form of an asterisk A indicating a call from a facsimile machine. In the event that the call character signal is not on a negative list in the reference storage memory 20 (FIG. 2) the user of the instrument T likely will wish to add the signal. The operation is illustrated in FIG. 3. With the revelation of a call character signal as indicated, the user is afforded the opportunity to add such a signal using the manual controls 18. Specifically, as indicated by the query block 74, if the temporarily stored call character signal is not to be listed, it is cleared and a "no" path from the block 74 advances the process to the clear block 69. Conversely, if the user wishes to add the call character signal to the negative list, activation of a manual control 18 (FIG. 2) directs the process to a block 76 representing the operation of storing the call character signal in the reference storage memory 20. Essentially, the signals are gated from the unit 22 through the gate 24 to be represented in the reference memory 20.

Recapitulating to some extent, the appearance of a call character signal, e.g. a CNG signal, prompts a correlation test performed by the unit 28 correlating the received call character signal with a stored or referenced call character signal from the memory 20. In a negative-list embodiment, the receipt of a call character signal that is similar to a reference call character signal (from the memory 20) results in rejection of the call as indicated by query block 58 (FIG. 3) directing the process to the termination operation as indicated by the block 54. Alternatively, approval advances the process from the block 58 as illustrated in FIG. 3. Thereafter, the call character signal may be stored for future reference.

While the above description is specific to the operation of a negative-list embodiment, as indicated above, various criteria may be utilized based on call identification signals manifest in the line C1 (FIG. 1). That is, in addition to, or alternatively to, negative-list operation, a positive-list embodiment mode may be employed. Also, numerous recognition techniques are readily available and may be utilized to implement specific operations of call screening based on the manifest call identification signals.

As discussed, indications for call character signals may take a variety of different forms, including the CNG signal as discussed in detail. In that regard, call character signals also may involve various criteria, including time, audio signals, tagged calls, periods of silence and so on.

Figure 5:
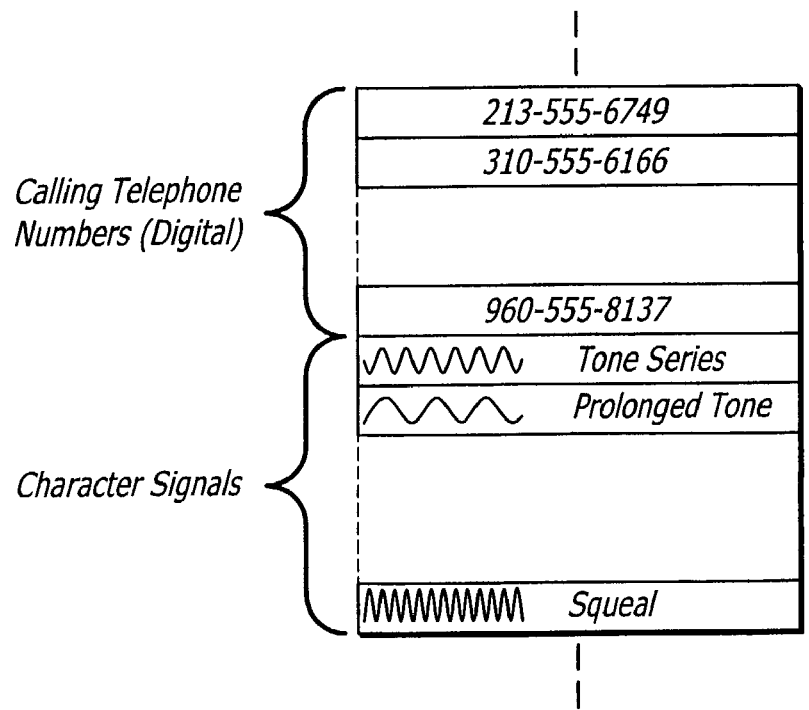
FIG. 5 is a chart indicative of reference storage in the screening unit of FIG. 2.

FIG. 5 indicates a format for the reference storage memory 20 (FIG. 2) whereby representations for calling telephone numbers and call character signals are stored. In accordance with the operation explained, the current or test calling number in the working storage 22 is sequentially compared with the stored reference calling numbers seeking a coincidence. A somewhat similar operation is performed for the call character signals. As illustrated, call character signals may involve a burst series, a prolonged tone, a squeal and so on, with varying frequencies, time, intervals and so on. Also, indications for call character signals may simply involve silent intervals with respect to time. Thus, the control unit 14 (FIG. 2) simply recognizes manifest indications for a call signal and provides a representative form. For subsequent control, with manifest indications of character signals identified, the control unit 14 (FIG. 2) provides a representative form in the working storage unit 22, which may be gated under manual control into the reference memory 20.

The forms of call character signals also may depend to some extent on the manner in which calls are placed. For example, one mass-calling technique involves simultaneously dialing a plurality of numbers, then accepting the first to answer and rejecting the remainder. As a specific example, four target numbers may be called by an automated system which communicates with the first line to be answered and rejects the others. Thus typically, one of the four lines is answered in a matter of seconds and the others are disconnected. Such mass-calling techniques may involve unwanted calls and accordingly, call character signals may be formulated upon recognition of such calls. Similarly, calls that provide a recorded message also may be indicated in some manner to prompt the provision of call character signals.

To consider operations of the present invention related to the above techniques, the control unit 14 may monitor incoming calls simply delaying the "pick-up" operation for several seconds to accommodate the possibility of a disconnect as indicated above. Essentially, the "ring" signal for the instrument T (FIG. 1) is delayed briefly to confirm the presence of a caller. If no caller is present then the call is simply terminated. In the course of the operation, a message may be placed on the line C1 to accommodate the delay. For example, a caller may simply be advised: "One moment please". Of course, the user of the telephone instrument T is unaware of such operations. The implementing system may be embodied primarily in the control unit 14 or a call character signal may be formulated by the unit 14 for transmission to the correlation unit 28 and operation as described above.

Various other techniques may be employed in accordance herewith to accomplish call screening as variously described. However, in view of the above explanations of exemplary systems and operations, it will be apparent that other embodiments and processes may be employed utilizing the developments hereof as in relation to instruments, telephonic equipment, call character identification techniques, storage and programming. Accordingly, the proper scope hereof is deemed appropriately determined on the basis of the claims as set forth below.

What is claimed is:

1. A call screening system for blocking unwanted incoming calls to a telephonic instrument from a telephonic apparatus, which calls are received through a public switched telephone network and whereby call identification representations generated by a calling telephonic apparatus reveal the character of a call, the call screening system comprising:
   a receiver to interface an incoming call and associated call identification representations;
   a signal recognition structure for receiving the call identification representations and to directly recognize select of said call identification representations that are generated by a facsimile capability of the calling telephonic apparatus by a comparison against stored reference data to selectively identify unwanted incoming facsimile calls to said telephone instrument; and
   a call screening structure controlled by the signal recognition structure to block unwanted facsimile calls to the telephone instrument as selectively identified.

2. A call screening system according to claim 1 for blocking unwanted facsimile calls wherein the signal recognition structure unit recognizes call identification representations including tonal sounds indicative of a calling facsimile machine as select representations of unwanted incoming facsimile calls.

3. A call screening system according to claim 1 further including a storage for calling number representations of unwanted incoming facsimile calls to command a screening operations based on calling number representations.

4. A call screening system according to claim 3 further including a working register to temporarily store calling number representations pending manual operation to store select calling number representations for subsequent screening operations.

5. A call screening system according to claim 1 further including a calling number recognition unit for receiving calling number representations to identify telephone numbers and wherein the call screening structure also screens calls from select telephone numbers.

6. At least one processor readable storage device having processor readable code embodied on said processor readable storage device, the processor readable code for programming the at least one processor to perform a method of telephone call screening for a telephone instrument for unwanted calls received from a calling telephonic apparatus through a public switched network, which calling telephonic apparatus provides call identification signals including call character signals reveling the character of an incoming call, the method comprising the steps of:
   interfacing a called telephone line to receive said call identification signals generated directly by a calling telephonic apparatus provided through the public switched telephone network;
   identifying certain select of said received call identification signals including call character signals associated with a facsimile transmission call by a comparison against stored reference data and indicating unwanted facsimile telephone calls to provide a blocking signal; and
   terminating the interface of calls under control of the blocking signal.

7. A device according to claim 6 wherein the method further comprises identifying the certain select of said received call identification signals to include signals indicative of a facsimile transmission call generated by a facsimile capability of the calling telephonic apparatus.

8. A device according to claim 6 wherein the method further comprises identifying certain calling number signals as representative of unwanted calling telephone numbers to provide a blocking signal.

9. A device according to claim 6 wherein the method further includes storing reference identification signals as a basis for identifying said certain select of the received call identification signals.

10. A device according to claim 9 wherein the stored reference identification signals are call character signals revealing the character of an incoming call.

11. A device according to claim 9 wherein the stored reference identification signals revealing the character of an incoming call are indicative of a facsimile transmission call generated by a facsimile capability.

12. A device according to claim 8 wherein the reference calling number signals indicative of an unwanted calling telephone number are stored.

13. A device according to claim 6 wherein the method further includes storing certain manually selected calling number signals received from the public switched telephone network.

14. A device according to claim 13 wherein the method further includes a step of clearing stored calling number signals in response to a manual command.

15. A call screening process for blocking unwanted calls to a telephone instrument, which are received through a public switched telephone network from a calling telephonic apparatus and whereby call identification signals provided by the calling telephonic apparatus reveal the character of an incoming call and accompany incoming calls to the telephone instrument, the call screening system comprising the steps of:
   interfacing incoming calls to the telephone instrument to provide call identification signals including the call identification signals generated by the calling telephonic apparatus to indicate a facsimile transmission call;
   directly recognizing select of the call identification signals provided to the telephone instrument;
   identifying select of the recognized call identification signals to command a screening operation of a facsimile transmission call by a comparison against stored reference data; and
   blocking incoming facsimile calls under control of the screening operation.

16. A method according to claim 15 further including a step of providing termination message to at least certain of said blocked incoming calls.

* * * * *

Disclaimer

7,379,544 B2 — Ronald A. Katz, Los Angeles, CA (US). COMPREHENSIVE TELEPHONE CALL SCREENING SYSTEM. Patent dated May 27, 2008. Disclaimer filed January 28, 2016, by the assignee, Telebuyer, LLC.

Hereby disclaim complete claims 1-16 of said patent.

*(Official Gazette, April 5, 2016)*